United States Patent [19]
Åkerlind

[11] Patent Number: 6,040,565
[45] Date of Patent: *Mar. 21, 2000

[54] OVEN OPERATION ONLY UPON DETECTING OF AN IDENTIFICATION MARK ON A FOOD OR BEVERAGE CONTAINER PLACED IN THE OVEN

[75] Inventor: Jan Åkerlind, Stockholm, Sweden

[73] Assignee: CD Food Technology AB, Stockholm, Sweden

[*] Notice: This patent is subject to a terminal disclaimer.

[21] Appl. No.: 09/029,882

[22] PCT Filed: Sep. 13, 1996

[86] PCT No.: PCT/SE96/01143

§ 371 Date: Mar. 2, 1998

§ 102(e) Date: Mar. 2, 1998

[87] PCT Pub. No.: WO97/11342

PCT Pub. Date: Mar. 27, 1997

[30] Foreign Application Priority Data

Sep. 15, 1995 [SE] Sweden .................................. 9503201

[51] Int. Cl.⁷ .............................. H05B 6/68; G01K 11/12
[52] U.S. Cl. ......................... 219/705; 711/714; 711/725; 711/502; 116/216; 374/149; 99/325; 426/88
[58] Field of Search ..................................... 219/710, 711, 219/714, 506, 494, 502, 720, 725, 704, 705; 116/216; 374/149, 150; 99/325, DIG. 14, 451; 426/88

[56] References Cited

U.S. PATENT DOCUMENTS

| | | |
|---|---|---|
| 4,786,773 | 11/1988 | Keefer . |
| 4,839,485 | 6/1989 | Koch et al. .............................. 219/702 |
| 4,933,525 | 6/1990 | Phillips . |
| 5,011,042 | 4/1991 | Bunce et al. ............................ 219/702 |
| 5,321,232 | 6/1994 | Ogle . |
| 5,426,280 | 6/1995 | Smith . |
| 5,504,311 | 4/1996 | DuBuis et al. .......................... 219/714 |

FOREIGN PATENT DOCUMENTS

| | | |
|---|---|---|
| 58-193028 | 11/1983 | Japan ..................................... 219/714 |
| 6-94244 | 4/1994 | Japan . |
| 2217557 | 10/1989 | United Kingdom . |
| 9627122 | 9/1996 | WIPO . |

*Primary Examiner*—Philip H. Leung
*Attorney, Agent, or Firm*—Nixon & Vanderhye P.C.

[57] ABSTRACT

An oven and a vessel having a food-stuff or beverage in it cooperate to provide optimum operation of the oven to cook or heat the food-stuff or beverage. The vessel is dimensioned to fit within the oven and has an information carrier for indicating the temperature of the food-stuff or beverage within the vessel by changing color, and a separate identification marking. A detector within the oven detects the identification marking and activates a control device for the oven if at least one predetermined identification requisite from the identification marking is met. The identification marking preferably is a hologram which may be visible, or invisible, to the naked human eye. A separate non-temperature sensitive mark may be provided on the vessel and is sensed by a separate sensing device to allow the oven to start operation.

25 Claims, 1 Drawing Sheet

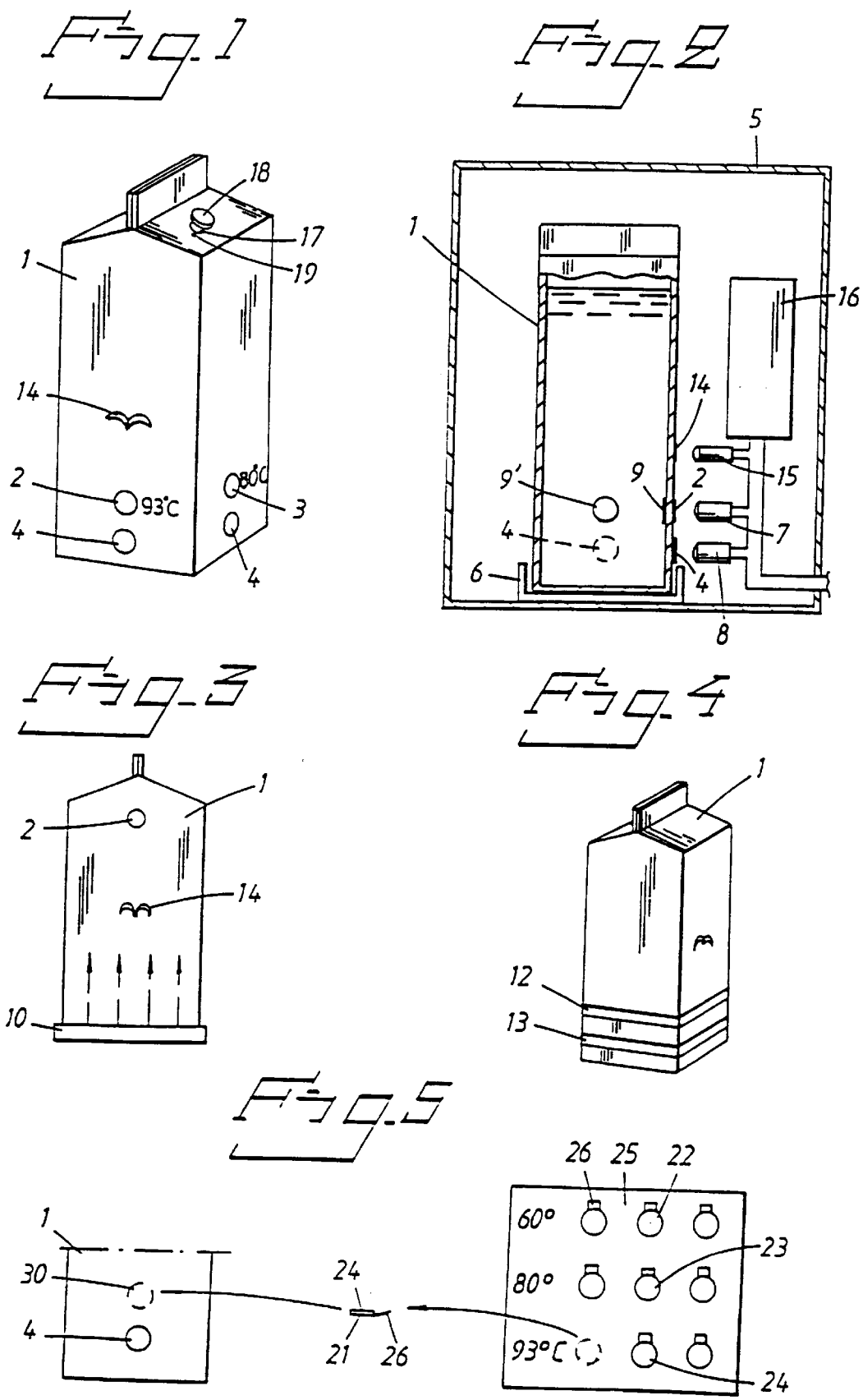

OVEN OPERATION ONLY UPON DETECTING OF AN IDENTIFICATION MARK ON A FOOD OR BEVERAGE CONTAINER PLACED IN THE OVEN

BACKGROUND AND SUMMARY OF THE INVENTION

The present invention relates to a vessel, particularly to a vessel having walls of a material which permits heating of the content of the vesssel by radiation, in particular microwave radiation.

Such vessels, and the term vessel is used here to include also packages and containers of different kinds which normally, at least partially, have walls of a material which depends on the actual kind of heating. If the heating takes place by heat radiation of the type infrared heat radiation from e.g. a cooking plate, the material may be metal, at least in the bottom. If the heating takes places by means of the nowadays very common heating type using micro-vawes, then the material may be cardboard or plastics or the like. Below, to facilitate, such vessels, along with the instant content in each case, will sometimes be referred to as "object".

Common to all types of heating is the problem of accurately controlling the temperature, e.g. to prevent that the temperature is insufficient for the application in question or to prevent that the vessel as used bursts up and starts leaking due to too a high internal pressure within the vessel, which may happen if the temperature has unintentionally become too high. This problem has been solved, to essential proportions, by the invention that constitutes the subject matter of the patent . . . (Swedish patent application number 95 01942, filed May 24, 1995).

According to the just mentioned patent a solution of the recited problem has been achieved in that the vessel is provided with an information carrier having one or more optically readable control information fields which information carrier is adapted to be used in order to indicate the temperature of the object as the object is heated in an oven. Here, it is conceivable, for instance, to watch visually how the information carrier shifts color as the desired temperature has been reached, so that the heating procedure may be stopped then.

However, the information carrier is preferably adapted to cooperate with an optical reading device of the oven and a control device to control the heating procedure at least partially in dependence of the read temperature information.

According to the invention it is preferred that the information carrier is arranged directly on the heating object, e.g. as a disposable label or, alternatively, as a device for repeated use, which device is applied on the object, its vessel, package or container, e.g. as the heating is performed.

According to the said patent it is preferred that the label or device comprises a field of temperature sensitive color which exhibits a color shift at the desired end temperature of the object, preferably the ready-temperature of a food-stuff or a beverage.

It is conceivable, according to the invention, that the information carrier has the shape of a label or a device for use in an oven having a lighting within the oven cavity, in which case the information carrier preferably is characterized in that the field with temperature sensitive color is composed of two layers, viz. an uppermost layer, which shifts from transparent into non-transparent, or vice versa, at a color shift, and a lowermost layer, which exhibits fluorescense at activation by the oven cavity lighting.

In the patent it has been stated that the invention generally is based on the concept that it is possible to utilize optical reading for the provision of a control system for an oven, which is partially associated with the oven itself, and the technical establishment thereof, and which is partially associated with the object or the food-stuff which should be subjected to heating/preparation, and, further, the realization that such a system, particularly the case with feed-back control, which in known ovens is solely associated with the technical establishment of the oven, may achieve considerable simplifications in the design of the control system of the oven and the general operation of the oven, and that this may be achieved while utilizing cost efficient technical solutions that are known per se by those skilled in the art. There exists no principal limit for how much control information may be taken from the information carrier. Just as well as the information carrier may hold information for choice of a pre-set program with the control unit of the oven, the information carrier itself may comprise the control program, which is then read into the control unit at the actual use. In the present case the term optical reading is used, e.g. reading while using light vawelengts within the optical range, but also other vawelengths may be possible. Thus, the information carrier may comprise fields with chrystalline or similar substances which at activation by scanning radiation my be cauesd to emit their information by discrete vawelengths or within defined vawelength-ranges. A feedback control may be achieved in that these substances are adapted to emit radiation of a temperature dependent vawelength.

According to a further development of the invention the vessel may be provided with a further characterizing feature in the shape of an additional, temperature non-sensitive color marking which is disposed in such a manner that it can be detected by a further detecting device, adapted to control the start of the heating procedure. Only vessels having a marking that controls the stop of the heating are provided with the additional color marking, which results in that if a vessel that lacks both kinds of markings is inserted into e.g. a microvawe oven having an indicator for stopping of the heating then no heating can be started. In this way it is prevented that a heating is started that cannot be automatically interrupted at the desired temperature.

In view of the fact that many manufacturers are able to provide information cariers and various kinds of color marks which may be useful for the above recited purposes it would be conceivable that vessels provided with information carriers or separate information carriers for application to vessels and intended to function in the above described ways would be produced and sold by unauthorized persons. Of course, this means a serious disadvantage, e.g. in that an authorized manufacture of vessels might be accused and declared guilty for faults and deficiencies of vessels that have been unauthorized manufactured and sold.

The present invention has for its object to remedy the just mentioned disadvantage and to provide a vessel which permits authorized use only.

To the just mentoned end the vssel according to the present invention is characterized essentially in that it is provided with an identification marking which is adapted to cooperate with a detecting means, preferably disposed within the oven, which means is adapted to actuate a control device which permits function of the oven only if one or more pre-determined identification requisites are met.

Preferably, the identification marking comprises one or more holograms which may be designed in comparatively complicated patterns or combinations thereof and thus may be nearly impossible to counterfeit. Further, they may be either visible, in which case they may fullfill decorative purposes, or hidden for the eyes, in which case the security against unauthorized use of vessels of the above recited kind is further enhanced.

BRIEF DESCRIPTION OF THE DRAWINGS

The invention is disclosed in more details below with reference had to the accompanying drawing which schematically shows various exaples of vessels according to the invention and wherein FIG. 1 is a perspective view of a vessel according to a first embodiment, used as an example, FIG. 2 is a side elevation of a vessel according to a second example, disposed in a micro-vawe oven, FIG. 3 is a side elevation of a vessel according to a third embodiment disposed on a heating plate, FIG. 4 is a perspective view of a vessel acording to a further embodiment, and FIG. 5 is view of a chart of color markings and a partial view of a vessel having a marking for disposition of color marks.

DETAILED DESCRIPTION OF THE DRAWINGS

FIG. 1 shows a container or vessel of conventional type, containing water and a capsule with instant coffee powder (not shown). The content of the capsule should be heated up to 93° C. in order for the capsule to open, and, thus, in order for the coffee so produced to have the correct serving temperature. Therefore, the container is provided with a temperature sensitive color marking 2 which shifts color at a temperature of the outer surface of the vessel that corresponds to a temperature of 93° C. of the coffee within the vessel with a ordinary performed cooking, which has to be determined from case to case. On an adjacent side the container is provided with another temperature-sensitive color marking 3 which shifts its color at a temperature of 80° C. of the content of the container. Further, the continer 1 is provided with two reference color marks 4 which denote that the container is intended to be used for heating in a micro-vawe oven having automatic means for control of the heating up to the desired temperature.

Such an oven 5 is shown schematically in FIG. 2. A container 1 of the kind as shown in FIG. 1, although made from a transparent material and having a color marking 9 disposed internally of the container, is placed in the oven in a guide 6 for the lowermost part of the container with the color marking 9 facing a sensing device 7. Simultaneously, one of the reference color marks 4 is positioned opposite a second sensing device 8. When the oven is switched on the sensing device 8 senses the existence of the color mark 4 and activates a relay or the like so that the oven starts the heating. Within a few minutes the content of the container has reached the desired 93° and the color mark 9 shifts color which is sensed by the sensing device 7 which interrupts the heating through a relay or the like (not shown). In case a heating to only 80° C. had been desired then the container should have been placed in the oven with the color mark 9 facing the sensing device 7.

The design of the oven 5 and of the devices 7 and 8 do not form a part of the invention, and therefore they are not described in more details here.

As an alternative, the heating may take place on a heating plate, FIG. 3. A vessel 1 placed on such a heating plate has preferably a color marking 2 placed on the uppermost portion of the vessel in order that it should not be affected too much by disturbing heat on the our side of the vessel from the heating plate 10.

FIG. 4 illustrates and alternative embodiment of the color marks 2 and 3, viz. in the shape of color tapes 12 and 13, corresponding to the color marks 3 and 4 in FIG. 1. The color tapes run around the periphery of the vessel and, thus, the vessel must not be turned in any special direction as it is placed into an oven of the kind ask shown in FIG. 2. Sometimes, particularly with containers that may be opened and resealed, it is desirable to determine the heating temperature from case to case. It is then possible to use self-adhering color markings that are applied to the container in question. Such color markings on a carrier 21 of self-adhering plastics are shown in FIG. 5 and are denoted 22, 23 and 24 for the temperatures 60° C., 80° C. and 93° C., respectively, and are affixed to a chart 25. To facilitate detaching the carriers 21 are provided with a flap, that is non-adhering and on which the temperature values are preferably printed. One such color marking is adapted to be affixed to a container which is provided with a an indication 30 where the color marks 22, 23 och 24 are to be placed in order to get a correct position within the micro-vawe oven. If desired,the color markings may be detached from the container 1 after use, and again affixed to the chart 25 for repeated use a number of times.

According to the invention the vessels are provided with an identification marking 14 which is adapted to cooperate with a reading device 15, preferably disposed within the oven and adapted to actuate a control device 16 which permits function of the oven only by meeting one or more predeterminded identification requisites.

The identification marking preferably comprises one or more holograms shich may be given rather complicated patterns or pattern combinations. Further, they may be either visible, in which case the may serve decorative purposes, or hidden for the eye, in which case the security against unauthorized use of vessels of the above recited kind is furhter enhanced.

In FIG. 1 it is shown that the vessel is preferably provided with a pouring spout 17 having a lid 18. In the example an idenfication marking 19 is disposed in such a manner that it is normally hidden by the lid 18, at least partially. In this way one is compelled to open the lid at least partially to permit heating. In this way the risk for unallowed over-pressures within the vessel during heating is eliminated.

What is claimed is:

1. A combination of an oven and vessel for heating preparation of food-stuffs or beverages, comprising:
    an oven for heating food-stuffs or beverages;
    a vessel having a food-stuff or beverage therein, and dimensioned to fit within said oven, and having an information carrier having at least one optically readable control information field, said information carrier for indicating the temperature of a food-stuff or beverage within said vessel;
    said vessel provided with an identification marking comprising at least one hologram;
    a control device for said oven; and
    detecting means disposed within said oven for detecting said identification marking, and for actuating said control device as to permit operation of said oven only if at least one predetermined identification requisite is met.

2. A combination as recited in claim 1 wherein said identification marking is visible from the exterior of said vessel.

3. A combination as recited in claim 1 wherein said information carrier is disposed on the exterior of said vessel.

4. A combination as recited in claim 3 wherein said information carrier comprises a plurality of color change elements, which change color at different temperatures.

5. A combination as recited in claim 1 wherein said information carrier is disposed on an inner surface of a translucent portion of said vessel, so that said information carrier is visible from the exterior of said vessel.

6. A combination as recited in claim 1 wherein said vessel has a plurality of sides, and wherein said information carrier comprises a plurality of color change elements associated with different sides of said vessel, for changing color at different temperatures.

7. A combination as recited in claim 1 further comprising a non-temperature sensitive mark on said vessel, and a sensor for sensing said non-temperature sensitive mark on said vessel to control said control device to operate said oven to start heating of the food-stuff or beverage within said vessel in response to sensing of said non-temperature sensitive mark on said vessel.

8. A combination as recited in claim 7 further comprising a second sensor for sensing said information carrier and for controlling operation of said control device for said oven in response to the sensing of the temperature of a food-stuff or beverage within said vessel exhibited by said information carrier.

9. A combination as recited in claim 8 wherein said information carrier comprises a plurality of color change elements which change color at different temperatures, and wherein said second sensor comprises an optical sensor for sensing said color changes.

10. A combination as recited in claim 9 wherein said hologram is invisible to the naked human eye.

11. A combination as recited in claim 1 wherein said hologram is invisible to the naked human eye.

12. A combination of an oven and vessel for heating preparation of food-stuffs or beverages, comprising:
   an oven for heating food-stuffs or beverages;
   a vessel having a food-stuff or beverage therein, and dimensioned to fit within said oven, and having an information carrier having at least one optically readable control information field, said information carrier for indicating the temperature of a food-stuff or beverage within said vessel;
   said vessel provided with an identification marking;
   a control device for said oven;
   a non-temperature sensitive mark on said vessel;
   a sensor for sensing said non-temperature sensitive mark on said vessel to control said control device to operate said oven to start heating of the food-stuff or beverage within said vessel in response to sensing of said non-temperature sensitive mark on said vessel, and
   detecting means disposed within said oven for detecting said identification marking, and for actuating said control device as to permit operation of said oven only if at least one predetermined identification requisite is met.

13. A combination as recited in claim 12 further comprising a second sensor for sensing said information carrier and for controlling operation of said control device for said oven in response to the sensing of the temperature of a food-stuff or beverage within said vessel exhibited by said information carrier.

14. A combination as recited in claim 13 wherein said information carrier comprises a plurality of color change elements which change color at different temperatures, and wherein said second sensor comprises an optical sensor for sensing said color changes.

15. A combination as recited in claim 13 wherein said identification marking is invisible to the naked human eye.

16. A combination as recited in claim 12 wherein said vessel has a plurality of sides, and wherein said information carrier comprises a plurality of color change elements associated with different sides of said vessel, for changing color at different temperatures.

17. A combination as recited in claim 12 wherein said information carrier is disposed on an inner surface of a translucent portion of said vessel, so that said information carrier is visible from the exterior of said vessel.

18. A container facilitating heating preparation of food-stuffs or beverages, comprising:
   a vessel having a food-stuff or beverage therein, dimensioned to fit within an oven;
   an information carrier having at least one optically readable control information field, said information carrier for indicating the temperature of a food-stuff or beverage within said vessel, and said information carrier operatively mounted to or in said vessel;
   an identification marking on said vessel distinct from said information carrier, said identification marking capable of being detected by a detector to control operation of an oven; and
   a non-temperature sensitive mark on said vessel and capable of being sensed by a sensor associated with an oven to control start-up operation of the oven.

19. A food container as recited in claim 18 wherein said identification marking comprises at least one hologram.

20. A food container as recited in claim 19 wherein said at least one hologram is visible to the naked human eye.

21. A food container as recited in claim 19 wherein said at least one hologram is invisible to the naked human eye.

22. A food container as recited in claim 18 wherein said vessel comprises a pouring spout and a lid on said spout, and wherein said identification marking is partially hidden by said lid.

23. A food container as recited in claim 18 wherein said vessel includes at least a portion of a vessel wall made of a transparent material; and
   wherein said identification marking, said non-temperature sensitive mark, and said information carrier are disposed within said vessel and visible through said transparent portion of said vessel wall.

24. A food container as recited in claim 18 wherein said information carrier is adhesively attached to said wall.

25. A container as recited in claim 18 wherein said vessel has a wall, and further comprising indicia for indicating appropriate positioning of said information carrier on said wall.

* * * * *